US006681986B1

(12) United States Patent
Ueda

(10) Patent No.: US 6,681,986 B1
(45) Date of Patent: Jan. 27, 2004

(54) METHOD AND APPARATUS FOR PERSONAL IDENTIFICATION, AND AUTOMATIC CASH HANDLING MACHINE

(75) Inventor: Tsutomu Ueda, Shizuoka-ken (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 10/210,093

(22) Filed: Aug. 2, 2002

(51) Int. Cl.[7] .......... G06F 17/60
(52) U.S. Cl. .......... 235/379; 235/380
(58) Field of Search .......... 235/375, 380, 235/379

(56) References Cited

U.S. PATENT DOCUMENTS 6,601,759 B2 * 8/2003 Fife et al. .......... 235/375

FOREIGN PATENT DOCUMENTS

JP 2-171030 7/1990

* cited by examiner

*Primary Examiner*—Harold I. Pitts
(74) *Attorney, Agent, or Firm*—Foley & Lardner

(57) ABSTRACT

An apparatus for personal identifying retrieves the personal identification number and entry conversion data corresponding to the identification number when a user is identified. The apparatus converts the numeric values entered from the numeric buttons, based on the entry conversion data. The apparatus collates the converted numeric values with the personal identification number.

11 Claims, 7 Drawing Sheets

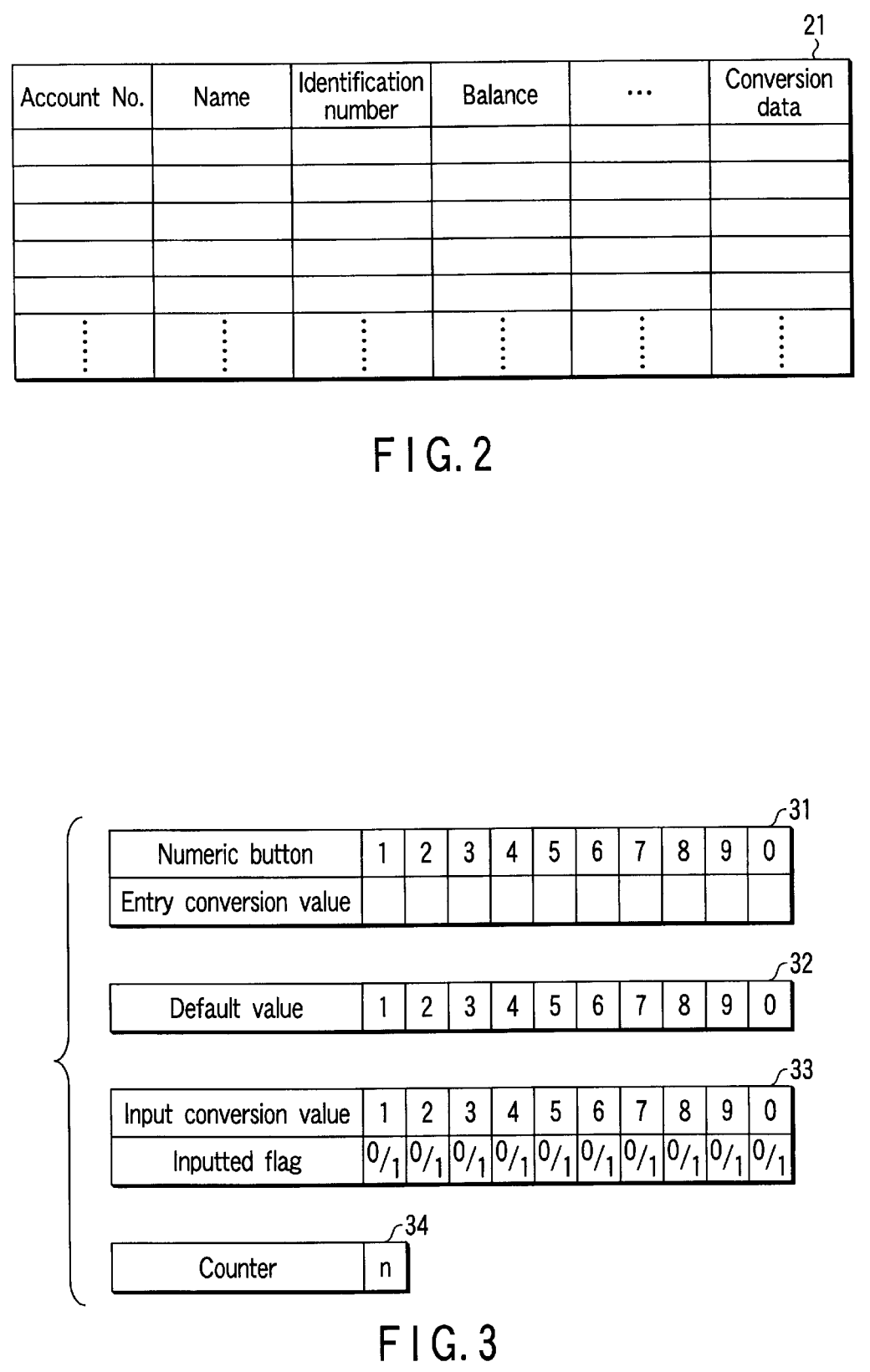

21

| Account No. | Name | Identification number | Balance | ... | Conversion data |
|---|---|---|---|---|---|
| | | | | | |
| | | | | | |
| | | | | | |
| | | | | | |
| | | | | | |
| ⋮ | ⋮ | ⋮ | ⋮ | ⋮ | ⋮ |

FIG. 2

31

| Numeric button | 1 | 2 | 3 | 4 | 5 | 6 | 7 | 8 | 9 | 0 |
|---|---|---|---|---|---|---|---|---|---|---|
| Entry conversion value | | | | | | | | | | |

32

| Default value | 1 | 2 | 3 | 4 | 5 | 6 | 7 | 8 | 9 | 0 |
|---|---|---|---|---|---|---|---|---|---|---|

33

| Input conversion value | 1 | 2 | 3 | 4 | 5 | 6 | 7 | 8 | 9 | 0 |
|---|---|---|---|---|---|---|---|---|---|---|
| Inputted flag | 0/1 | 0/1 | 0/1 | 0/1 | 0/1 | 0/1 | 0/1 | 0/1 | 0/1 | 0/1 |

34

| Counter | n |
|---|---|

FIG. 3

METHOD AND APPARATUS FOR PERSONAL IDENTIFICATION, AND AUTOMATIC CASH HANDLING MACHINE

BACKGROUND OF THE INVENTION

1. Field of the Invention

The present invention relates to an apparatus for identifying a card user by a personal identification number, and an automatic cash handling machine such as an automatic cash dispenser (CD) and an automatic teller machine (ATM) utilizing the apparatus for personal identification.

2. Description of the Related Art

Generally, an automatic cash handling machine such as CD and ATM used in the financial industry is designed to identify a card user by a personal identification number.

Au automatic cash handling machine is usually provided with ten numeric buttons 0 to 9. A card user inputs an identification number, amount of money and other numeric values by operating these buttons.

However, in conventional automatic cash handling machines, when a card user operates the numeric buttons, the numerals assigned to the buttons are entered directly. A personal identification unit of the machine collates the entered numerals with the personal identification number of the card user. When the entered numerals are identical to the personal identification number, the machine identifies the user.

Therefore, regarding conventional cash handling machines, anyone who knows a personal identification number can input the number. Thus, if a personal identification number is known by another person, it is difficult to prevent illegal use of the card.

Therefore, it is necessary to provide a method and apparatus for personal identification to prevent illegal use by another person even if a personal identification number is known by that person.

BRIEF SUMMARY OF THE INVENTION

A method of verifying a user according to an aspect of the present invention comprises identifying a user, acquiring the identification number of the user identified and entry conversion data associated with the identification number, converting a numerical value input by depressing numeric buttons in accordance with the entry conversion data acquired, and collating the numerical value converted, with the identification number of the user.

An apparatus for verifying a user according to an aspect of the present invention comprises numeric buttons to input numerical values, an identification unit to identify a user, an acquisition unit to acquire the identification number of the user identified and the entry conversion data associated with the identification number, a conversion unit to convert a numerical value input by depressing the numeric buttons, in accordance with the entry conversion data, and a collation unit to collate the numerical value converted with the identification number of the user.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and comprise a part of the specification, illustrate embodiments of the invention, and together with the general description given above and the detailed description of the embodiments given below, serve to explain the principles of the invention.

FIG. 2 is a view showing the data structure of a customer database;

FIG. 3 is a view showing memory areas formed in a memory;

DETAILED DESCRIPTION OF THE INVENTION

Figure 1:
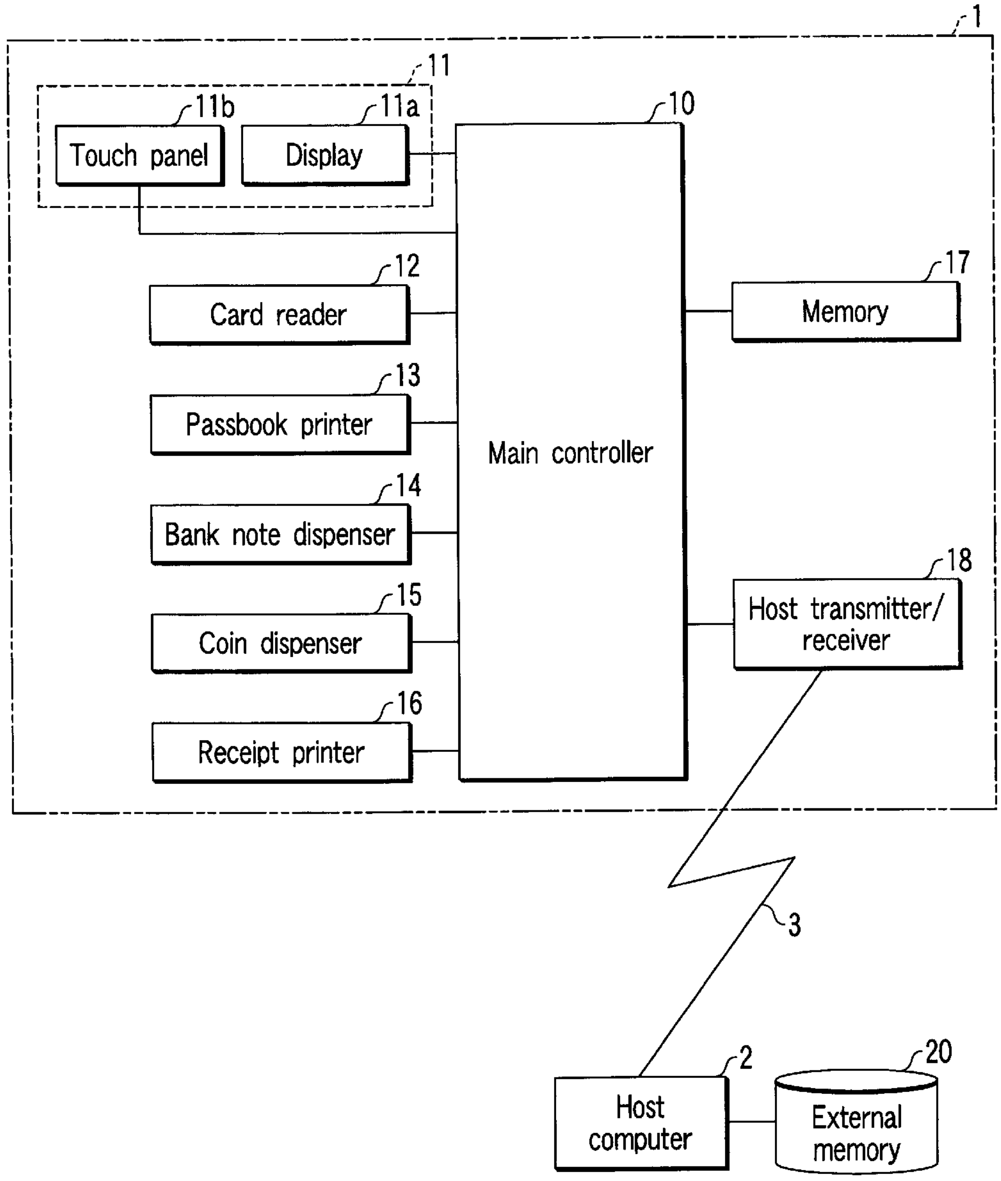
FIG. 1 is a block diagram of an automatic cash handling machine according to an embodiment of the present invention.

Referring first to FIG. 1, the basic construction of an automatic cash handling machine 1 according to an embodiment of the present invention will be described. The automatic cash handling machine is an ATM used by a cash card user to make financial operations such as deposits, withdraws, balance inquiries, updating passbooks, and make payments.

The automatic cash handling machine 1 is provided with a main controller 10 (central processing unit (CPU)). The main controller 10 is connected to an operation panel 11, a card reader 12, a passbook printer 13, a bank note dispenser 14, a coin dispenser 15, a receipt printer 16, a memory 17 and a host transmitter/receiver 18.

The main controller 10 controls various services executed by the automatic cash handling machine 1.

The operation panel 11 is used by a user to input various information. The operation panel 11 comprises a display 11*a* and a touch panel sensor 11*b*. The display 11*a* displays a guidance message for the user and various buttons. The buttons include a plurality of function buttons to select various services and ten numeric buttons, 0 to 9. The numeric buttons are used to input numeric data such as a personal identification number and amount of money.

The card reader 12 reads the data stored in a cash card. A cash card stores a financial institution identification code, bank account number and so on.

The passbook printer 13 prints data in a passbook. The bank note dispenser 14 dispenses and receives bank notes. The coin dispenser 15 dispenses and receives coins. The receipt printer 16 prints data in a predetermined form and issues it as a receipt.

The memory 17 stores data, and comprises a RAM (Random Access Memory). The host transmitter/receiver 18 transfers data with a host computer 2 installed in a financial institution. The host transmitter/receiver 18 is connected online 3 to the host computer 2.

The host computer 2 is connected with an external memory 20. The external memory 20 stores a customer database 21 containing various data on the customers having an account at that financial institution.

As shown in FIG. 2, the customer database 21 also contains the entry conversion data preset corresponding to the name, account number, personal identification number, balance and so on of each customer. The entry conversion data is composed of 10-digit numeric values used to convert the numeric values assigned to the numeric buttons depressed in the main controller 10. The entry conversion data is used by a cash card user to input a personal identification number by pressing the numeric buttons.

As shown in FIG. 3, the memory 17 includes an entry conversion table area 31, a default setting area 32, a flag table area 33, and a counter area 34.

The entry conversion table area 31 is used to assign a numeric value to be converted (entry conversion value) for each digit 1, 2, 3, 4, 5, 6, 7, 8, 9, 0 entered by the numeric buttons. The entry conversion data consists of 10 digits, or the ten entry conversion values corresponding to the numeric buttons, 1 to 0.

The default setting area 32 is used to store the default values for each entry conversion value. The area 32 previously stores as defaults the same numeric values as those to be entered by the numeric buttons. The default data consists of 10 digits numeric values [1234567890], or the defaults for the entry conversion values corresponding to the numeric buttons 1 to 0.

The flag table area 33 is used to store the flag information to discriminate whether or not something has been inputted, for each numeric value used as an entry conversion value (an input conversion value). The flag information being reset to 0 indicates non-inputted, and being set to 1 indicates inputted.

Referring now to the flow chart of FIG. 4, the operations of the main controller 10 will be explained.

Figure 4:
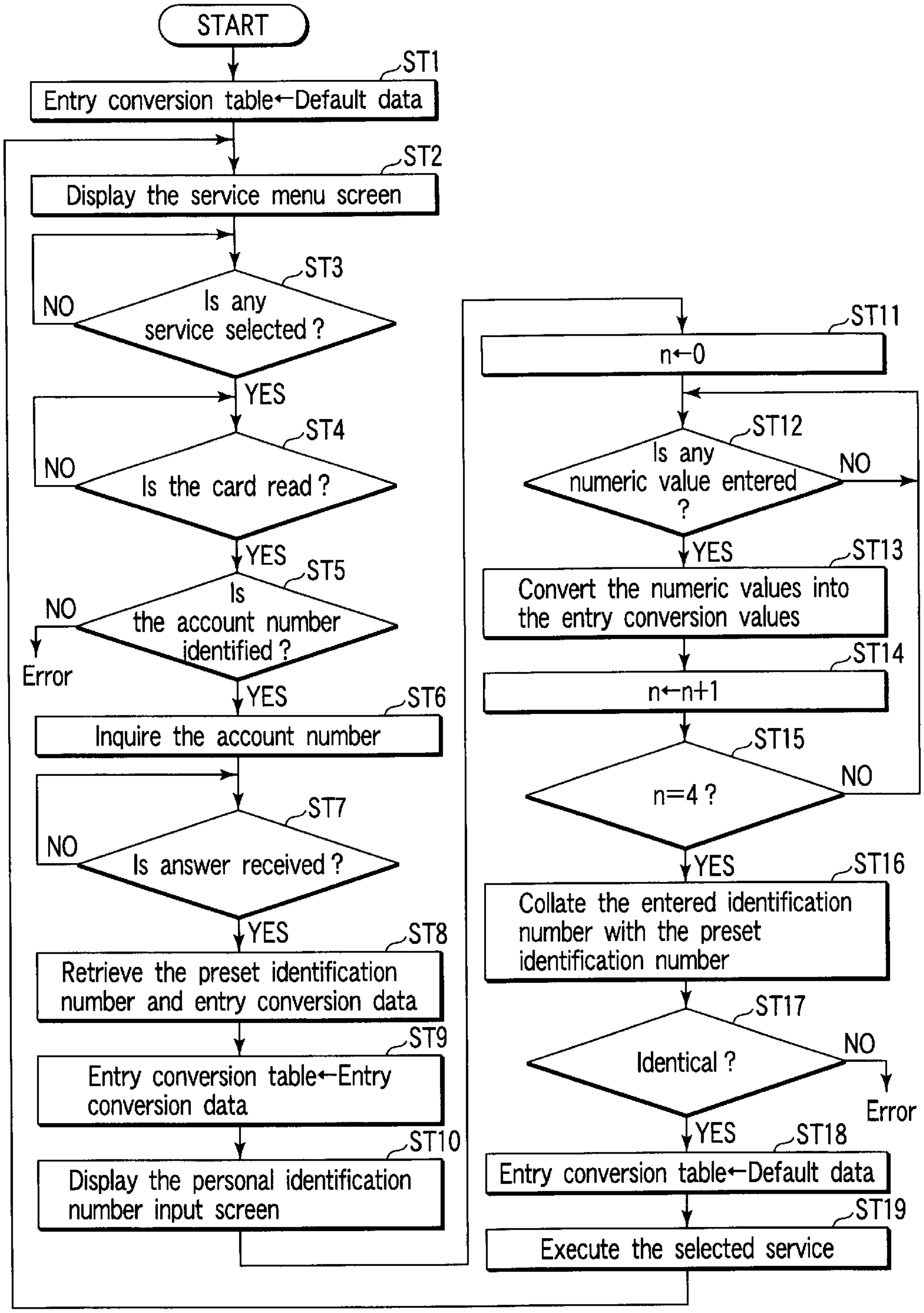
FIG. 4 is a flow chart of the operations of a main controller.

When power is supplied, the main controller 10 starts the operations shown in the flow chart of FIG. 4.

In step ST1, The main controller 10 transfers the default data from the default setting area 32 to the entry conversion table area 31. In step ST2, the main controller 10 displays a service menu screen in the display 11*a* of the control panel 11.

Figure 6:
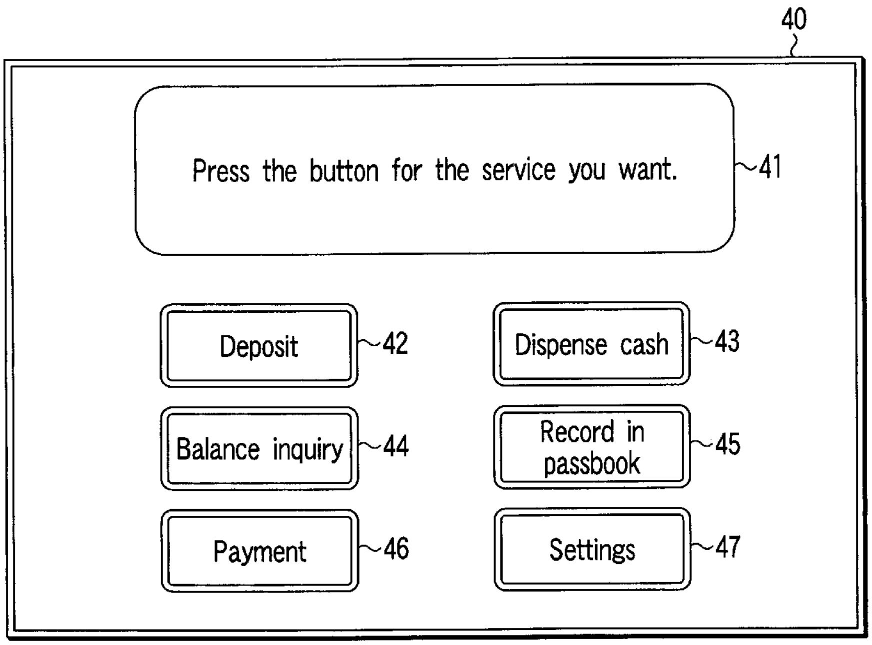
FIG. 6 is a view showing an example of a service menu screen.

FIG. 6 shows an example of a service menu screen 40. The service menu screen 40 includes a deposit button 42, a cash dispensing button 43, a balance inquiry button 44, a passbook record button 45, a payment button 46 and a setting button 47. In the guidance area 41 of the service menu screen 40, a guidance message for a cash card user is displayed.

When the service menu screen 40 is displayed, the main controller 10 waits for entry of any one of the buttons 42–47, in step ST3. When one of the buttons is depressed, the main controller 10 recognizes that the service assigned to that button is selected.

Then, in step ST4, the main controller 10 waits until the card reader 12 reads the card data. When the card data is read, the main controller 10 detects the account number from that card data, in step ST5. When the account number is not detected, the main controller 10 cannot identify the cash card user and handles it as an error due to illegal card use.

When the account number is detected, the main controller 10 can identify the cash card user. The main controller 10 inquires from the host computer 2 about the data of that account number, in step ST6. When the host computer 2 sends the inquiry through the host transmitter/receiver 18, the main controller 10 then waits for a response from the host computer 2, in step ST7.

The host computer 2 replies with the data of the account number (a personal identification number, balance, entry conversion data and so on). The account number data is read from the customer database 21.

Upon receiving the reply from the host computer 2, the main controller 10 retrieves the personal identification number (the preset identification number) and entry conversion data from the reply data, in step ST8. When retrieving the entry conversion data, the main controller 10 stores the entry conversion data in the entry conversion table area 31, in step ST9. When retrieving the personal identification number, the main controller 10 displays the personal identification number input screen in the display area 11*a*, in step ST10.

Figure 7:
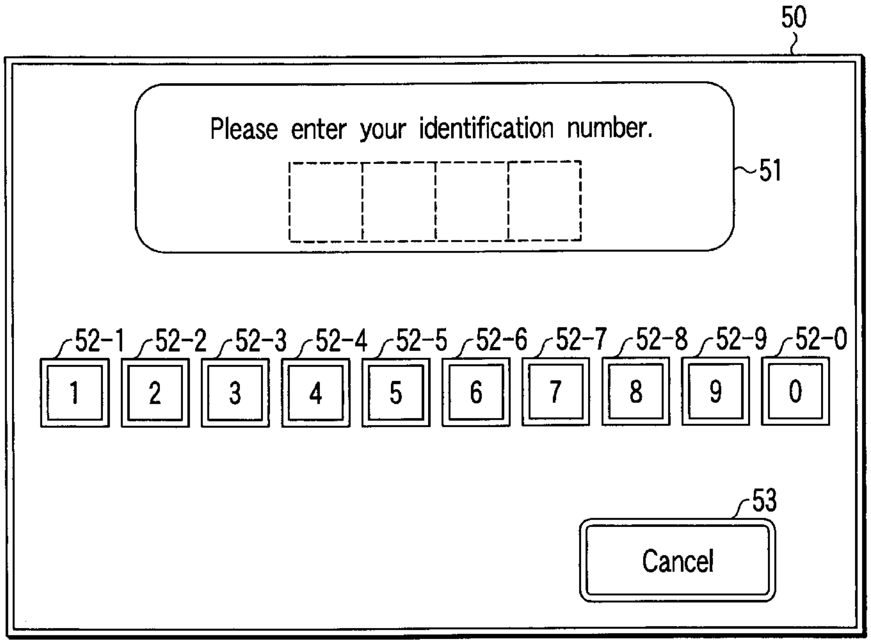
FIG. 7 is a view showing an example of a personal identification number input screen.

FIG. 7 shows an example of the personal identification number input screen 50. This screen 50 has ten numeric buttons 52 (52-1, 52-2, 52-3, 52-4, 52-5, 52-6, 52-7, 52-8, 52-9, 52-0) and a cancel button 53. Numeric values 0–9 are assigned to the numeric buttons 52, respectively. The guidance area of Hi the screen 50 includes a frame to display a guidance message for the cash card users to input a personal identification number and the squares for each digit of a personal identification number. Therefore, entry from the numeric buttons 52 are disabled until the main controller 10 retrieves a personal identification number and entry conversion data of a cash card user.

When the identification number input screen is displayed, the main controller 10 resets the counter 34 to 0, in step ST11. After the counter 34 is reset to 0, the main controller 10 waits for entry of the numeric buttons 52, in step ST12. When any one of the numeric buttons 52 is pressed, the main controller 10 refers to the entry conversion table area 31, and converts the numeric value assigned to the entered numeric button 52 into the preset entry conversion value, in step ST13.

Retrieving the entry conversion value, the main controller 10 adds 1 to the counter 34, and checks whether the count value n reaches 4, or the number of digits of the identification number, in step ST15. When the count value n does not reach 4, the main controller 10 returns to step ST12. The main controller 10 then waits for entry of the next digit button 52.

When the count value n reaches 4, the main controller 10 recognizes the four entry conversion values retrieved in step ST13 as the entered identification number. When the identification number is entered, the main controller 10 collates the entered identification number with the preset identification number, in step ST16. As a result, when the entered identification number does not coincide with the preset identification number, the main controller 10 judges it to be miss-entry of identification number and takes an error-handling operation.

When the entered identification number is identical to the preset identification number, the main controller 10 restores the data in the entry conversion table area 31 to default, in step ST18. After the main controller 10 restores the data in the entry conversion table area 31 to default, the main controller 10 executes the selected operation, in step ST19.

Finishing the selected operation, the main controller 10 returns to step ST2. Therefore, the main controller 10 repeats the steps following ST3, after making the display 11*a* display the service menu screen 40.

Referring now to the flow chart of FIG. 5, the operations of the main controller 10 in selection of preset services will be explained.

Figure 5:
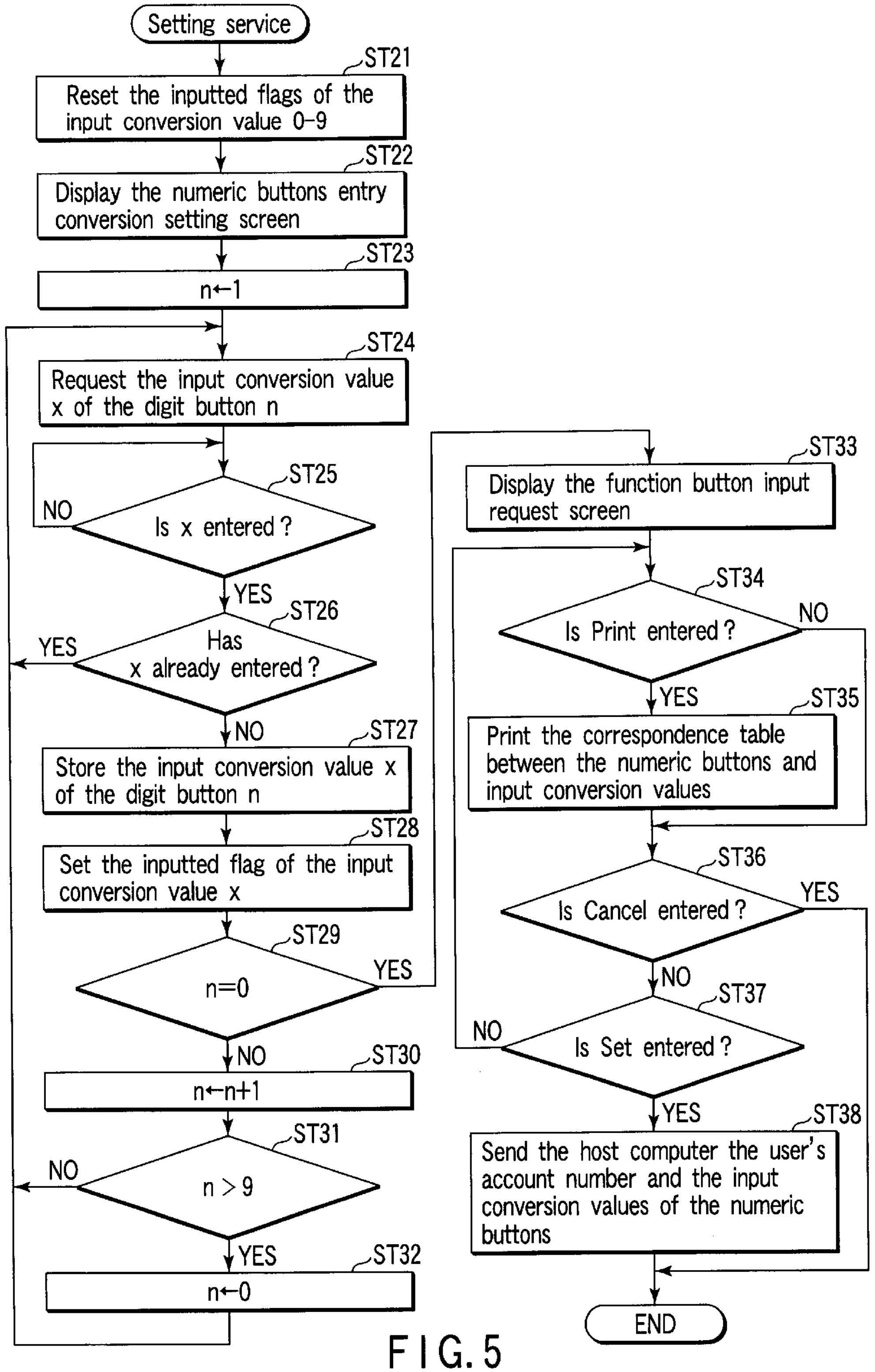
FIG. 5 is a flow chart of the setting service included in the operations of the main controller.

When the setting button 47 is pressed on the service menu screen 40, the main controller 10 goes to step ST19 and starts the processing shown in the flow chart of FIG. 5. Namely, the main controller 10 starts the processing on condition that the entered identification number is identical to the preset identification number.

The main controller 10 resets all inputted flags to 0 in the flag table area 33, in step ST21. After all inputted flags is reset to 0, the main controller 10 displays the entry conversion setting screen for the numeric buttons 52 in the display area 11*a*, in step ST22. Then, the main controller 10 sets the counter 34 to 1, in step ST23. Then, the main controller 10 displays the guidance message to the cash card user in the guidance area of the entry conversion setting screen, in step ST24. This guidance message includes the request to input a conversion value x ($0 \geqq x \leqq 9$) to be assigned to one digit button 62-n to which the count value n is assigned.

Figure 8:
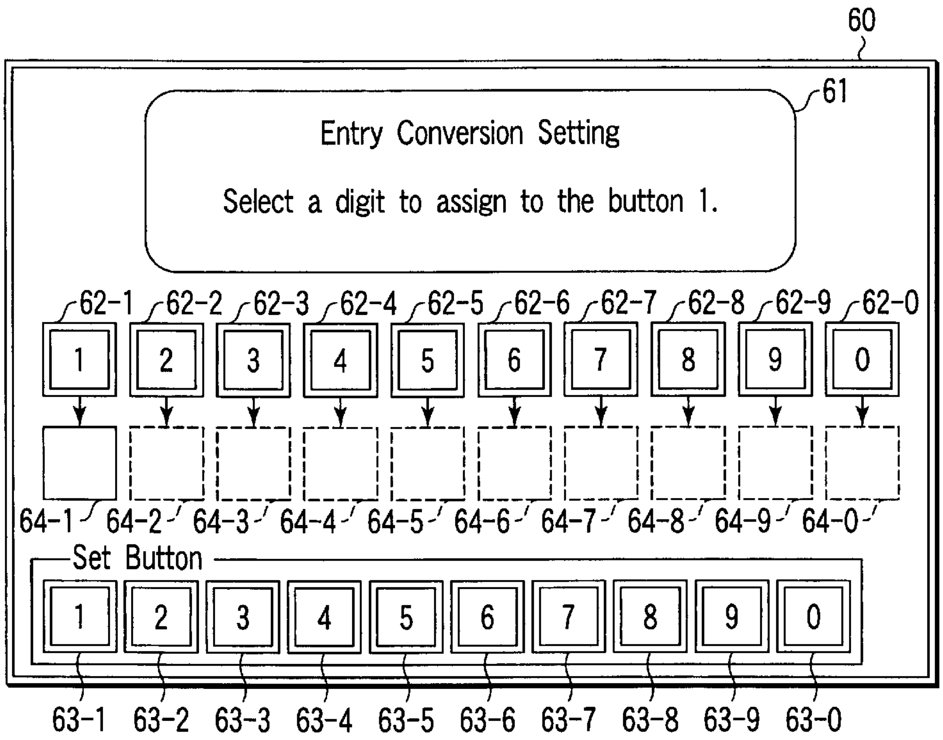
FIG. 8 is a view showing an example of an entry conversion setting screen.

FIG. 8 shows an example of an entry conversion setting screen 60. The screen 60 has ten numeric buttons 62 (62-1, 62-2, 62-3, 62-4, 62-5, 62-6, 62-7, 62-8, 62-9, 62-0) and ten setting buttons 63 (63-1, 63-2, 63-3, 63-4, 63-5, 63-6, 63-7, 63-8, 63-9, 63-0). The numeric buttons 62 are the same as the numeric buttons 52 of the personal identification number input screen 50. Input conversion values 0 to 9 are assigned to the setting buttons 63, respectively. Cells 64 (64-1, 64-2, 64-3, 64-4, 64-5, 64-6, 64-7, 64-8, 64-9, 64-0) are displayed under the numeric buttons 62. The cells 64 display the input conversion values assigned to the numeric buttons 62. In the guidance area 61 of this screen 60, a message to request the cash card user to input a conversion value x to be assigned to the numeric button 62-1 is displayed.

When the above guidance message is displayed, the main controller 10 waits for entry of the setting button 63, in step ST25. When one of the setting buttons 63 is pressed, the main controller 10 recognizes that the input conversion value x assigned to that setting button 63 is entered. Then, the main controller 10 examines the inputted flag corresponding to the input conversion value x in the flag table 33, in step ST26. When the inputted flag is set to 1, the main controller 10 recognizes that the input conversion value x is already inputted. When the inputted flag is reset to 0, the main controller 10 recognizes that the input conversion value x is not inputted.

When the input conversion value x is already inputted, the main controller 10 returns to step ST24. Therefore, the main controller 10 displays the guidance message to request the user to input a conversion value x to be assigned to the same numeric button 62-n.

When the input conversion value x is not inputted, the main controller 10 stores the input conversion value x in the entry conversion value area corresponding to the numeric button 62-n in the entry conversion table area 31, in step ST27. Then, the main controller 10 sets the inputted flag corresponding to the input conversion value x in the flag table 33 to 1, in step ST28.

Then, the main controller 10 examines whether the count value n is 0 or not, in step ST29. When the count value n is not 0, the main controller 10 increases the counter 34 by 1, in step ST30.

Then, the main controller 10 examines whether the count value n exceeds a threshold value or not, in step ST30. The threshold value is the maximum numeric value 9 assigned to the numeric buttons 62. When the count value n is lower than the preset value, the main controller 10 returns to step ST24. Therefore, the main controller 10 displays the guidance to request to input a conversion value x to be assigned to the next numeric button 62-n.

When the count value n exceeds the threshold value, the main controller 10 sets the counter 34 to 0, in step ST32. Then, the main controller 10 returns to step ST24. Therefore, the main controller 10 displays the guidance to request to input a conversion value x to be assigned to the digit button 62-0.

When the count value n is 0 in step ST29, the main controller 10 displays the function button input request screen in the display area 11*a*, in step ST33.

Figure 9:
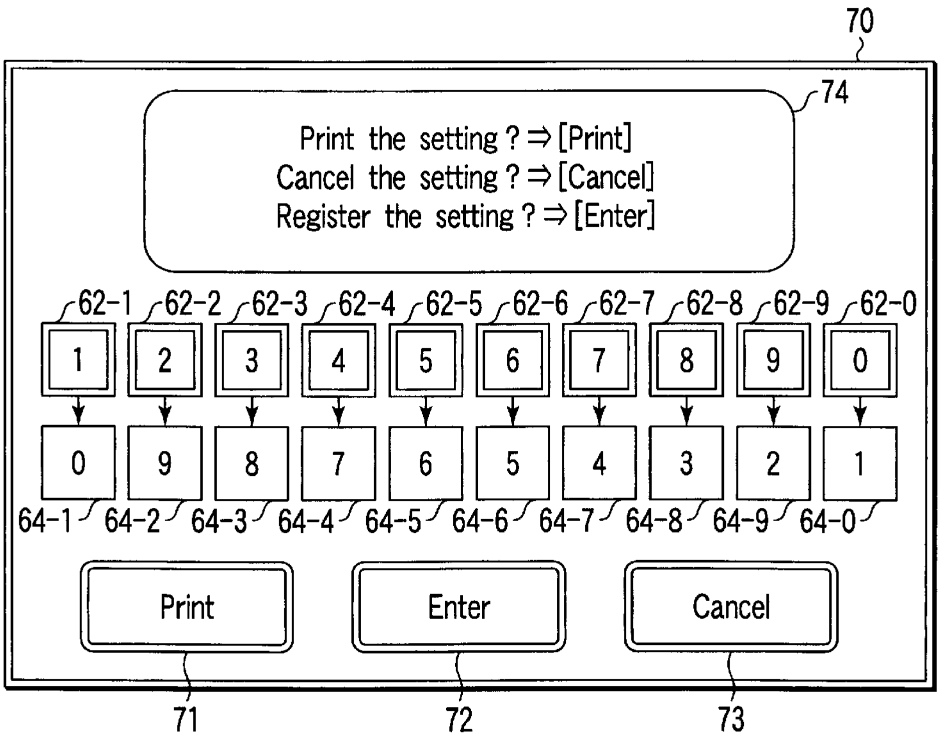
FIG. 9 is a view showing an example of a function button input screen.

FIG. 9 shows an example of a function button input request screen 70. This screen 70 has a print button 71, an enter button 72 and a cancel button 73. In the guidance area 74 of this screen 70, the guidance explaining the functions of the buttons 71–73 is displayed. Displayed also in this screen 70 are the numeric buttons 62 and cells 64, as in the entry conversion setting screen 60.

When the function button input request screen 70 is displayed, the main controller 10 waits for entry of any one of the function buttons, in steps ST34, ST37 and ST37.

When the print button 71 is pressed, the main controller 10 prints the correspondence table of the numeric values of the numeric buttons 62 and the input conversion values of the cells 63. The main controller 10 controls the receipt printer 16 to print the correspondence table on the receipt form. Then, the main controller 10 waits for entry of any function button.

When the cancel button 73 is pressed, the main controller 10 finishes the setting service.

When the enter button 72 is pressed, the main controller 10 reads the input conversion values stored in the entry conversion table area 31, in step ST38. The input conversion values are the numeric values after conversion assigned to the numeric values entered by the numeric buttons 62. Then, the main controller 10 sends back the input conversion values with the account numbers to the host computer 2. The account numbers are identified in step ST5 shown in FIG. 4. Then, the main controller 10 terminates the setting service.

Receiving the data (the input conversion value and account number) from the automatic cash handling machine 1, the host computer 2 retrieves the customer database 21. The customer database stores the account number included in the received data. The host computer 2 updates the entry conversion data corresponding to that account number to each input conversion value included in the received data. Therefore, the main controller 10 sets the numeric value after conversion assigned to each numeric value entered from each numeric button 62 as entry conversion data in the host computer 2.

Description will now be given of the procedures when the user sets the entry conversion data by operating the automatic cash handling machine 1 with reference to FIG. 6–FIG. 11.

First, the user presses the setting button 47 in the service menu screen 40 shown in FIG. 6. Next, the user inserts the cash card so that the card reader 12 reads the data of the card. The user can insert the card first, and then press the setting button.

When the card data is read, the account number of the cash card user is identified. After the account number of the cash card user is identified, the host computer 2 supplies the automatic cash handling machine 1 with the preset personal identification number corresponding to that account number and the entry conversion data. Then, the personal identification number input screen 50 is displayed, as shown in FIG. 7. The user enters his (her) identification number.

Assuming that the personal identification number is 4126 and the entry conversion data is not set, default data remains in the entry conversion table area 31. The user presses the button 4, 52-4, the button 1, 52-1, the button 2, 52-2 and the button 6, 52-6. Then, the entered identification number becomes 4126, identical to the preset identification number. When the entered identification number is confirmed identical to the preset number, the entry conversion setting service is enabled.

When the entry conversion setting service is enabled, the entry conversion setting screen 60 is displayed, as shown in FIG. 8. The user sets the input conversion values assigned to the numeric buttons, sequentially from the button 1, 62-1 to the button 0, 62-0. At each setting, the user press the setting button 63 to which the input conversion value is assigned.

When the setting button 63 is pressed, the inputted flag corresponding to that button 63 is set. After that, entry of the button 63 is disabled. Therefore, the same input conversion value will not be assigned to different numeric buttons.

Figure 10:
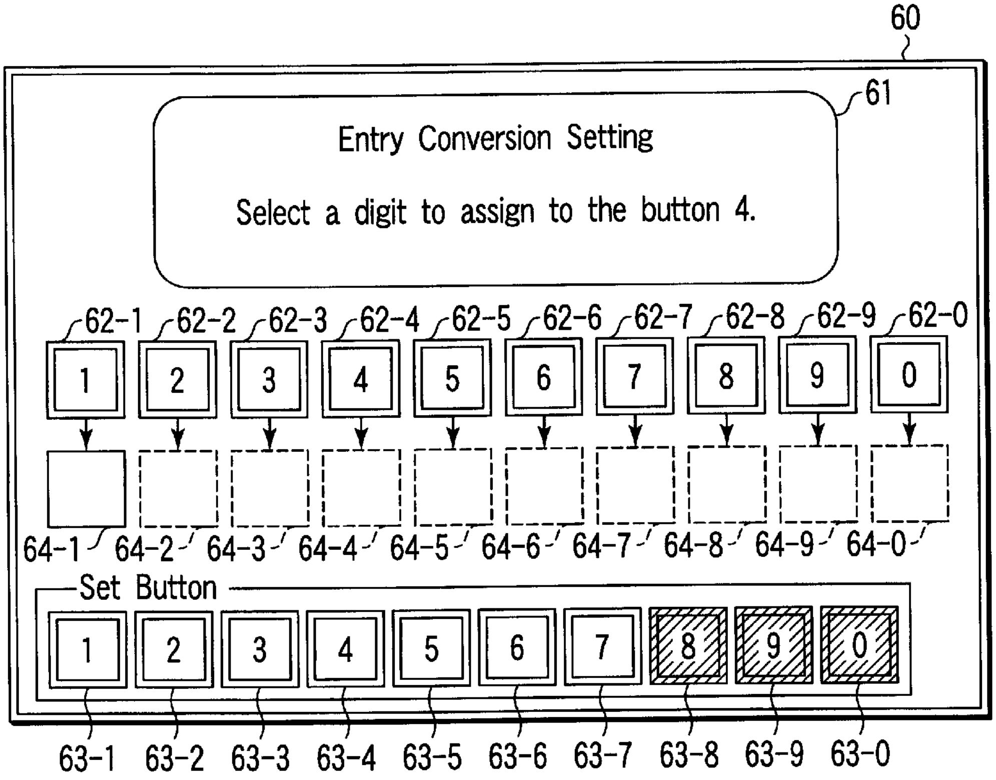
FIG. 10 is a view showing an example of an entry conversion setting screen.

FIG. 10 shows an example of the entry conversion setting screen 60 when input conversion values 0, 9, 8 are assigned to numeric buttons 1 to 3, 62-1 to 62-3. The input conversion values 0, 9, 8 are displayed in the cells 64-1 to 64-3 corresponding to the numeric buttons 62-1 to 62-3. The setting buttons 63-0, 63-9, 63-8, to which the numeric values 0, 9, 8 are assigned, are reversed for ease of use.

When an input conversion value is assigned to the numeric button 0, 62-0, the function button input request screen is displayed, as shown in FIG. 9. The user confirms the setting contents. The user presses the cancel button 73 to cancel the setting, presses the enter button 72 to enter the setting, and presses the print button 71 to print the setting contents.

Figure 11:
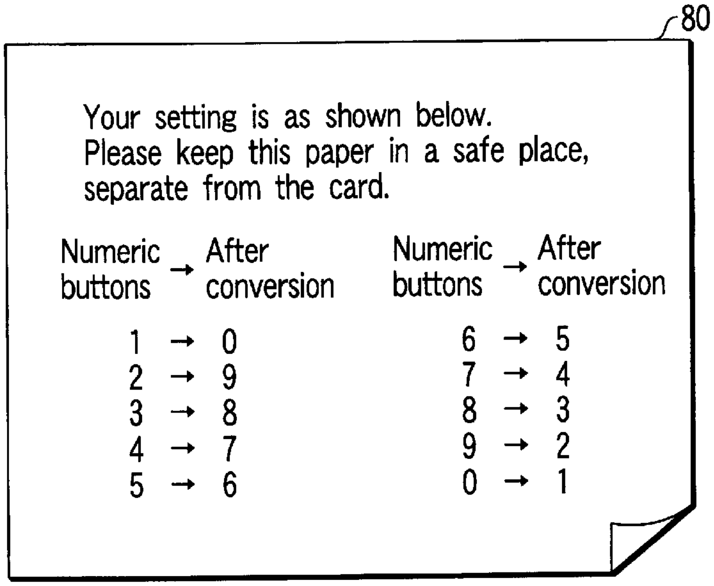
FIG. 11 is a view showing a print example of the correspondence table.

When the print button 71 is pressed, the correspondence table between the numeric buttons and input conversion values is printed. The table is printed by the receipt printer 16 on the receipt form. FIG. 11 shows an example of the correspondence table 80.

When the enter button 72 is pressed, the setting contents are sent to the host computer, and thereby the entry conversion data of that user is set in the customer database 21.

When a user uses the automatic cash handling machine 1 by the cash card with the account number for which the entry conversion data has been set, the user inputs his (her) personal identification number by the entry conversion data. For example, when the entry conversion data of the printed contents is included in the correspondence table 80, a numeric value 0 is entered when the user presses the numeric button 1, 52-1. Likewise, a numeric value 9 is entered when the user presses the numeric button 2, 52-2.

For example, when the personal identification number is 4126, the user presses the numeric buttons 7, 0, 9, 5, or 52-7, 52-0, 52-9, 52-5. Then, the numeric value 7095 will be converted into 4126 by the entry conversion data. Therefore, the personal identification number coincides with the preset number, and the services of the automatic cash handling machine 1 are enabled.

If the user presses the numeric buttons 4, 1, 2, 6, or 52-4, 52-1, 52-2, 52-6, the numeric value 4126 is converted into 7095 by the entry conversion data. In this case, the personal identification number does not coincide with the preset number, and the services of the automatic cash handling machine 1 are not enabled.

Many cash card users decide a personal identification number from personal information such as the date of birth and telephone number. This makes it easy to guess a personal identification number. The embodiment of this invention can prevent entry of correct personal number by other people even if a personal identification number is known, unless the entry conversion data is known. Therefore, illegal use of other person's cash card can be securely prevented.

The present invention is not limited by the above-mentioned embodiment.

A PIN pad is connected to a terminal which corresponds to a debit card and credit card. The PIN pad has a ten-key pad for the customer to enter a personal identification number. The numeric buttons include the ten keys of PIN pad.

In another embodiment, the terminal does not accept entry of ten keys for the first time. When the user is identified from the card data, the terminal retrieves the user's preset personal identification number and entry conversion data from the host computer. After retrieving the user's data, the terminal permits entry of ten keys.

The personal identification unit to identify the user includes identification based on personal data such as name and ID code.

Steps ST12–ST14 in FIG. 4 can be modified to convert the entered numeric value into entry conversion value after the count value n of the counter 34 reaches the threshold value 4.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of verifying a user by using an identification number, comprising:

identifying the user;

acquiring the identification number of the user identified and entry conversion data associated with the identification number;

converting a numerical value input by depressing numeric buttons, in accordance with the entry conversion data acquired; and collating the numerical value converted, with the identification number of the user.

2. A method of verifying a user, according to claim 1, further comprising disabling entry of the numerical value by depressing the numeric buttons, until the identification number of the use and the entry conversion data are acquired.

3. An apparatus for verifying a user by using an identification number, comprising:

numeric buttons configured to input numerical values;

an identification unit configured to identify the user;

an acquisition unit configured to acquire the identification number of the user identified by the identification unit and entry conversion data associated with the identification number;

a conversion unit configured to convert a numerical value input by depressing the numeric buttons, in accordance with the entry conversion data acquired by said acquisition unit; and a collation unit configured to collate the numerical value converted by the conversion unit, with the identification number acquired by the acquisition unit.

4. An apparatus for verifying a user, according to claim 3, further comprising an input controller configured to disable entry of the numerical value by depressing the numeric buttons, until the identification number of the user and the entry conversion data are acquired by the acquisition unit.

5. An apparatus for verifying a user, according to claim 3, further comprising:

an assignment unit configured to assign a numerical value converted, to each numerical value input by depressing the numeric buttons;

a setting unit configured to set the numerical value converted and assigned by said assignment unit to each numerical value entered by depressing the numeric buttons, as entry conversion data of said user; and an update controller configured to enable the assignment unit to assign numerical values, on condition that the collation unit determines that the numerical value converted is identical to the identification number.

6. An apparatus for verifying a user, according to claim 5, further comprising a printing unit which prints contents set by the setting unit.

7. An automatic cash handling machine which verify a user by using an identification number, comprising:

numeric buttons configured to input numerical values;

an identification unit configured to identify the user;

an acquisition unit configured to acquire, from a host computer, the identification number of the identified user identified by the identification unit and entry conversion data associated with the identification number;

a conversion unit configured to convert the numerical value input by depressing the numeric buttons, in accordance with the entry conversion data acquired by the acquisition unit;

a collation unit configured to collate the numerical value converted by the conversion unit, with the identification number acquired by the acquisition unit; and a service controller configured to allow for cash-handling service on condition that the collation unit determines that the numerical value converted is identical to the identification number.

8. An automatic cash handling machine according to claim 7, further comprising an input controller configured to disable entry of the numerical value by depressing the numeric buttons, until the identification number of the user and the entry conversion data are acquired by the acquisition unit.

9. An automatic cash handling machine according to claim 7, further comprising:

an assignment unit configured to assign a numerical value converted, to each numerical value input by depressing the numeric buttons;

a setting unit configured to set, in the host computer, the numerical value converted and assigned by said assignment unit to each numerical value entered by depressing the numeric buttons, as entry conversion data of said user; and an update controller configured to enable the assignment unit to assign numerical values, on condition that the collation unit determines that the numerical value converted is identical to the identification number.

10. An automatic cash handling machine according to claim 9, further comprising a printing unit which prints the contents set by the setting unit.

11. An automatic cash handling machine according to claim 10, wherein the printing unit is a receipt printer to print the cash-handling service contents on a predetermined receipt form.

* * * * *